R. ALBRECHT.
OVEN ATTACHMENT.
APPLICATION FILED JUNE 2, 1920.

1,359,306.

Patented Nov. 16, 1920.
2 SHEETS—SHEET 1.

WITNESSES

INVENTOR
R. ALBRECHT
BY
ATTORNEYS

R. ALBRECHT.
OVEN ATTACHMENT.
APPLICATION FILED JUNE 2, 1920.

1,359,306.

Patented Nov. 16, 1920.
2 SHEETS—SHEET 2.

WITNESSES

INVENTOR
R. ALBRECHT
BY
ATTORNEYS

UNITED STATES PATENT OFFICE.

ROBERT ALBRECHT, OF ARLINGTON, NEW JERSEY.

OVEN ATTACHMENT.

1,359,306.  Specification of Letters Patent.  Patented Nov. 16, 1920.

Application filed June 2, 1920. Serial No. 385,993.

*To all whom it may concern:*

Be it known that I, ROBERT ALBRECHT, a citizen of the United States, and resident of Arlington, in the county of Hudson and State of New Jersey, have invented a new and Improved Oven Attachment, of which the following is a full, clear, and exact description.

In connection with ovens, and more particularly baking ovens utilized for the purpose of making bread, etc., it is a well appreciated fact that the air within the baking compartment is dried to a point where the bread is liable to become hardened due to the lack of moisture in the air.

With this in view, it has been customary for bakers to place a pan of water within the baking compartment so that the steam emanating therefrom would serve to produce a sufficient amount of moisture to insure proper baking conditions.

This as will be readily appreciated, is but an unsatisfactory expedient, in view of the fact that the air is liable to become surcharged due to the excessive moisture, resulting in the baking of soggy bread, and in the event that the water completely evaporates from the receptacle in which it is contained, the atmosphere within the baking compartment will quickly return to its extremely dry condition.

From the above it will be seen that up to the present day is has been customary to either have a baking oven incorporating a compartment containing an atmosphere of extreme dryness or else, by means of the receptacle aforementioned, to provide a humidifying medium which is not subject to regulation, and which is liable at any moment to cease functioning subsequent to which the atmosphere within the baking compartment will, as aforestated, readily return to its previous dry condition.

With this in view, I have constructed an oven appliance which will seek to cure the defects heretofore enumerated, in that a humidifying medium will be formed by means of which the atmosphere within the making compartment may be surcharged with a definite quantity of moisture.

Reference is had to the attached sheet of drawings as illustrating one practical embodiment of my invention, and in which drawings, Figure 1 is a front view of a baking oven indicating in dotted lines the position of my appliance therein.

Figure 1:
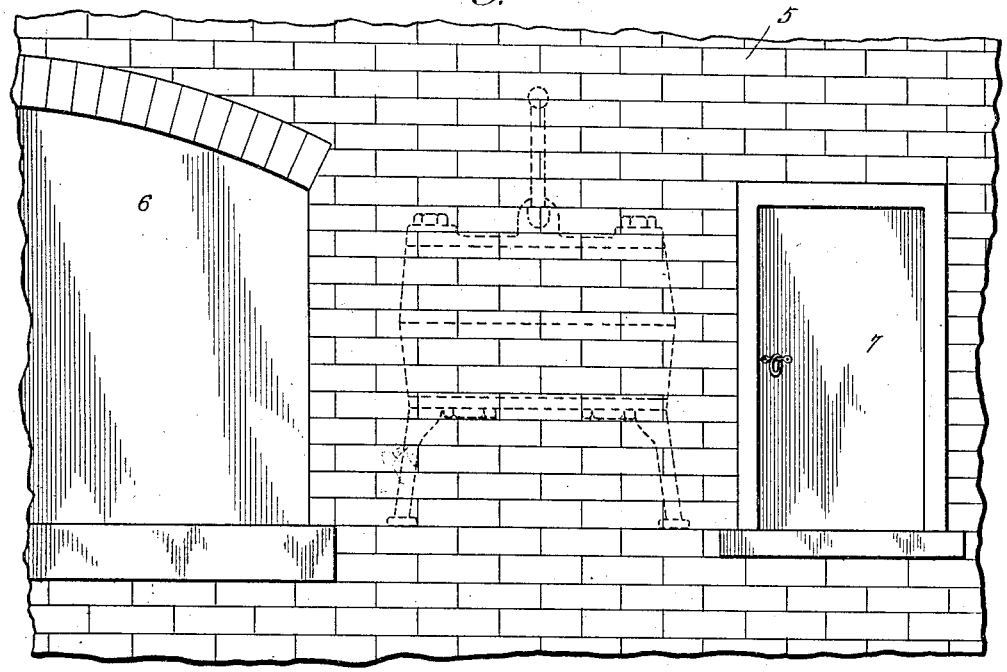

In these views the reference numeral 5 indicates the front face of a baking oven provided with the conventional baking compartment 6 and fire door 7.

My appliance is conveniently positioned within the compartment 6, and adjacent to that partition extending between the same and the fire box. The appliance may be made of any desired size, and it conveniently includes a housing 8 conveniently formed adjacent its rear end with a steam chest 9, it being noted that the housing 8 is preferably subdivided into an upper and lower compartment 10 and 11 respectively, by means of a partition wall 12.

Figure 2:
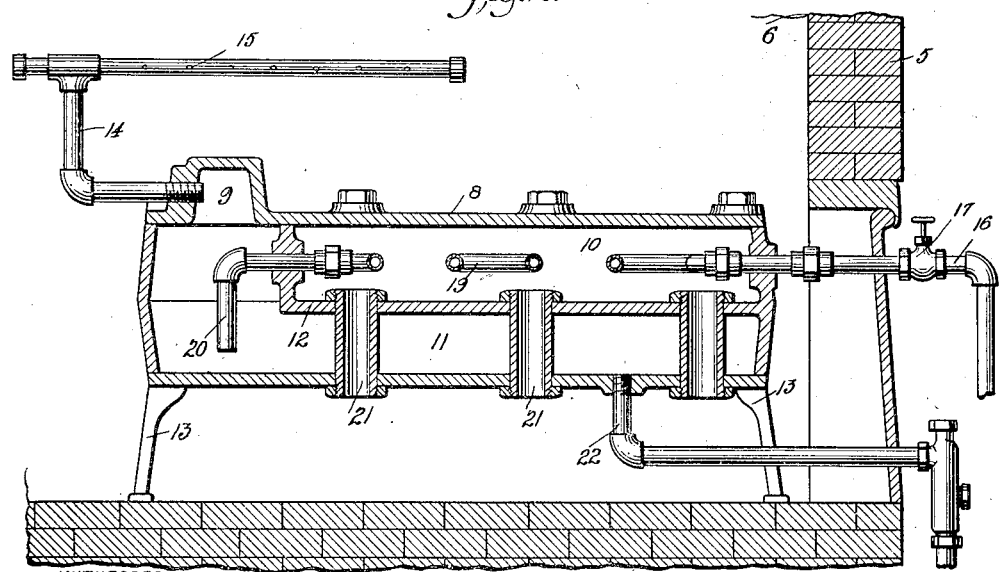
Fig. 2 is a sectional view taken through the baking compartment, and appliance, therein.
Figure 3:
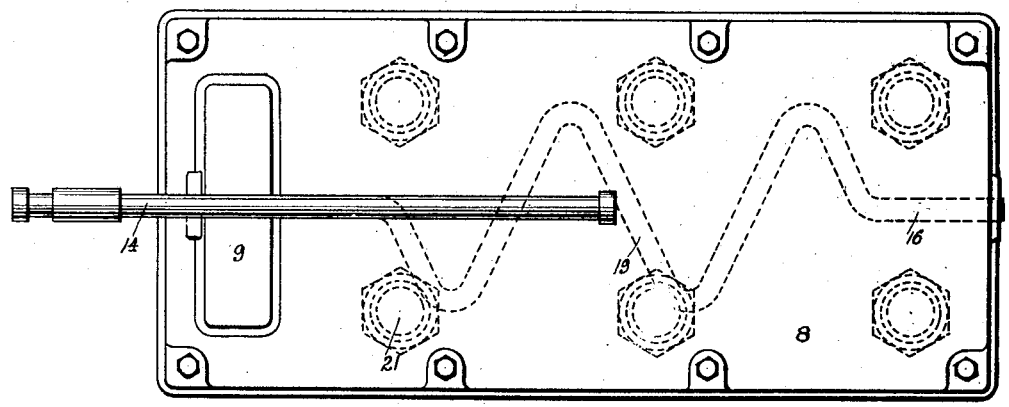
Fig. 3 is a plan view of the appliance.
Figure 4:
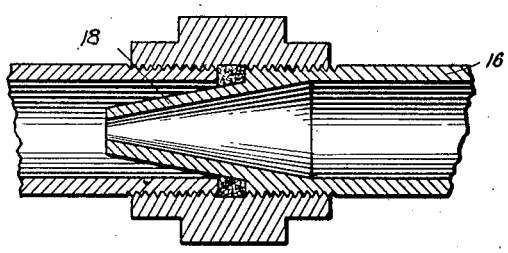
Fig. 4 is an enlarged sectional detail view of a certain detail of construction forming a part thereof.

The housing may be conveniently spaced from the upper face of the floor of the baking compartment so as to permit of the free circulation of the heated air around the same, by means of any suitable supporting means 13. A distributing pipe 14 has its inner end connected with the steam chest 9, as has been clearly shown in Fig. 2, and it will be seen that its upper end is conveniently formed with a series of perforations 15, to permit of the distribution of steam vapor from the steam chest 9 through the baking compartment 6.

Now with a view of providing means permitting the introduction of fluid into the appliance, and for generating vapor, a water inlet pipe 16 is provided, the flow of fluid through which may be controlled by means of any suitable valve 17. The pipe extends into the upper compartment 10 of the housing 8, and is provided adjacent its point of entrance with a suitable type of sprayer nozzle 18 for a purpose hereinafter more fully specified.

The pipe is subsequently formed with a series of coils 19 within the compartment 10 from whence it extends downwardly to a point conveniently underlying the steam chest 9, at which point it terminates, as has been indicated by the reference numeral 20.

To permit of the introduction of heat into the upper compartment 10, a series of ducts formed by the pipes 21 are provided, which pipes extend through the lower compartment 11, and have their lower ends in communication with the space existent between the housing 8 and the surface upon which it rests, their upper ends being in communication with the compartment 10 at a point directly below the coils 19.

It will be appreciated that the housing may be constructed of any suitable metal such as boiler plate, which will permit of the closing of the valve 17, during that period at which the temperature of the oven is brought up to a point permitting baking, and prior to the introduction of the bread when the valve may be opened. This will result in the water passing the nozzle 18 and being sprayed into the coils 19, which by this time will, by virtue of the pipes 21 have reached an extremely high temperature. The steam generated will pass from the open end 20 of the pipe into the steam chest 9, and so into the distributing pipe 14.

As the appliance becomes cool through the action of the fluid, it will be understood that the water passing through the coils 19 may not have reached the point of vaporization by passing through them, and with this in view, the pipe is terminated as at 20, which will result in any excess water striking the lower surface of the housing 8, which, as will be readily understood, will act as a flash plate insuring the production of the necessary vapor.

Considering that the temperature of the oven is not sufficiently high to insure the production of vapor by means of the flash plate provision, or the coil, when it is desired to produce an extremely light vapor only, the valve 17 may be opened to its fullest extent, which will result in the production of a small amount of vapor, the surplus fluid being drained off through the pipe 22.

It will further be understood, that upon the bread reaching the desired consistency due to baking that the valve 17 may be entirely closed which will result in the cessation of the production of steam, permitting of a drying of the atmosphere and a browning of the bread.

Obviously numerous modifications of structure might be resorted to without in the least departing from the scope of my claims, which read—

What I claim as new is;—

1. An oven appliance, including a housing, pipes connected to said housing for permitting a passage of a current of fluid therethrough, means for pre-heating said fluid, and means for subsequently flashing the same into vapor.

2. An oven appliance, including a housing, a partition extending within said housing, and dividing the same into an upper and lower compartment, a pair of pipes extending one into each of said compartments, one of said compartments being formed with a steam chest, and a vapor distributing pipe extending from said steam chest.

3. An oven appliance, including a housing, a partition extending within said housing, and dividing the same into an upper and lower compartment, a pair of pipes extending one into each of said compartments, one of said compartments being formed with a steam chest, a vapor distributing pipe extending from said steam chest, one of said pipes being extended in the form of a coil through one of the compartments.

4. An oven appliance, including a housing adapted to be positioned in the baking compartment of an oven, a partition extending within said housing and dividing the same into an upper and lower compartment, pipes in communication one with each of said compartments whereby to permit of the circulation of fluid through the same, and further pipes extending from the exterior of said housing and in communication with said upper compartment.

5. An oven appliance, including a housing adapted to be positioned in the baking compartment of an oven, a partition extending within said housing and dividing the same into an upper and lower compartment, pipes in communication one with each of said compartments, and a spray nozzle arranged one within said pipes.

6. An oven appliance adapted to be positioned within the baking compartment of an oven, a partition extending within said housing and dividing the same into an upper and lower compartment, pipes extending from the exterior face of said nozzles, and in communication with said upper compartment, one of the first mentioned pipes extending in the form of a coil through said upper compartment, a steam chest forming a part of said housing, said coil pipe having its end terminating at a point below said steam chest, and a vapor distributing pipe in communication with said steam chest.

ROBERT ALBRECHT.